United States Patent Office 2,780,624
Patented Feb. 5, 1957

2,780,624

PROCESS OF PRODUCING PYRAZINAMIDE

John S. Webb and Herbert G. Arlt, Jr., Warren Township, Somerset County, N. J., assignors to American Cyanamid Company, New York, N. Y., a corporation of Maine No Drawing. Application January 29, 1953,
Serial No. 334,098

8 Claims. (Cl. 260—250)

This invention relates to an improved process of producing pyrazinamide.

Pyrazinamide, which has attained considerable importance as a tuberculostatic drug, is ordinarily prepared by amidation of an ester of pyrazinoic acid. While it is possible by this process to produce pyrazinamide in good purity, the process requires a number of steps and has numerous economic disadvantages. According to the present invention, we have found that pyrazinamide may be prepared cheaply and in a high degree of purity by the thermal decarboxylation of the hitherto unknown compound pyrazine - 2 - carboxamide-3-carboxylic acid. This new compound is not claimed as such in the present application, since it forms the subject matter of our copending application, Serial No. 334,097, filed January 29, 1953, now U. S. Patent No. 2,675,385.

Not only does the process of the present invention start out from a new chemical compound, but the process itself runs counter to the experience with the analogs of pyrazine-2-carboxamide-3-carboxylic acid in the benzene and pyridine series. Thus, for example, phthalamic acid and pyridine - 2 - carboxamide - 3 - carboxylic acid when heated form cyclic imides and do not decarboxylate partially to the mono-amide (Aschan Ber. 19, page 1402 and Philips Ann. 288, page 255). It is not known why pyrazine-2-carboxamide-3-carboxylic acid behaves in such an anomalous manner, and it is not intended to limit the present invention to any theory.

It is an advantage of the process of the present invention that it proceeds smoothly, pyrazinamide subliming out in a form in which it can be readily condensed in a receiver and collected in a good grade of purity without further purification. The temperature is in no sense critical, a good rate of decarboxylation resulting at temperatures slightly below 170° C. and temperatures considerably higher may be used. In general the range of workable temperatures will be from 160° C. to over 250° C.

Another method involves the use of an inert high-boiling solvent or diluent. In this case the pyrazinamide does not sublime out of the reaction mixture but remains dissolved or suspended in the liquid and may be isolated by filtration, crystallization, concentration or some similar processes. In either the dry process or one using an inert diluent, it is desirable, though by no means essential, to start at a temperature nearer the lower limit and to raise to a higher temperature after the reaction has proceeded for some time. In general, the time is moderate, varying of course with the size of the batch and the temperature used. It is a further advantage of the process that completion can be determined by noting the cessation of evolution of carbon dioxide. Where sublimation processes are used, the ordinary sublimation techniques of passing a stream of inert gas, such as nitrogen, may be employed in order to accelerate the removal of the pyrazinamide from the reaction zone.

As has been stated above, the pyrazinamide is obtained in good purity, free from any gross impurities but as it is normally used as a drug and therefore requires the extraordinary purity demanded in most pharmaceuticals, it is ordinarily further purified by recrystallization and the like. However, because of its initial high purity, these purification procedures are simple and economical.

The invention will be described in greater detail in conjunction with the following specific examples, the parts being by weight.

Example 1

166 parts of pyrazine-2,3-dicarboxamide (1 mol) is slurried in 1000 parts of 1N aqueous sodium hydroxide. The reaction mixture is heated at 95 to 98° C. until a clear solution results. Thereupon the mixture is cooled with ice to about 5° C. and acidified to approximately a pH of 1. The cold reaction mixture is allowed to stand until precipitation of the pyrazine-2-carboxamide-3-carboxylic acid is substantially complete whereupon it is recovered by filtration and dried at 50 to 60° C.

Example 2

100 parts of pyrazine-2-carboxamide-3-carboxylic acid is heated in a reaction vessel provided with an intake for inert gas. The reaction mixture is heated in a bath held at 220° C. and nitrogen is introduced. The solid material melts and effervesces and sublimed pyrazinamide vapors are carried out of the reaction vessel in the nitrogen stream. They are introduced into a suitably cooled condenser, condensing in the form of a white sublimate. After the reaction is proceeding vigorously the bath temperature is raised to 255° C. and then gradually and slowly allowed to drop to 190° C. over a period of time sufficient to permit the reaction to go substantially to completion. The sublimed pyrazinamide, if desired, is further purified by recrystallization from water or alcohol.

Example 3

100 parts of pyrazine-2-carboxamide-3-carboxylic acid is introduced into a vessel provided with surfaces which are relatively cool above the level of material. Heating is then started and a temperature of 170° C. obtained. The pyrazine-2-carboxamide-3-carboxylic acid melts and effervesces and vapors of pyrazinamide sublime out of the reaction mixture and are condensed on the cooler walls of the condenser. Heating is continued until the reaction is substantially complete at which point the pyrazinamide is recovered from the cooler surfaces, and if desired is purified further by recrystallization from water or alcohol.

Example 4

100 parts of pyrazine-2-carboxamide-3-carboxylic acid is introduced into a reaction vessel provided with surfaces maintained at a low temperature. The material is heated to 159° C., the reaction mixture slowly melting and then effervescing. Pyrazinamide sublimes out and is condensed on the cooler surfaces of the reaction vessel. After the reaction is complete, which takes considerably longer than at the higher temperatures in Examples 2 and 3, the sublimate is removed.

Example 5

100 parts of pyrazine-2-carboxamide-3-carboxylic acid and 1300 parts of orthodichlorobenzene are introduced into a reaction vessel equipped with stirrer and heater. The temperature is brought to 100° C. where agitation and effervescence begins. The heating is continued until the orthodichlorobenzene begins to reflux. The heat is then maintained until a clear solution results with only a small amount of residue. The clear solution is decanted from the residue and cooled at 5° C., pyrazinamide separating out as a crystalline product. After the precipitation is complete, the mixture is filtered and the pyrazinamide dried in an oven at 50 to 55° C. The grade of the pyrazinamide is not quite as high as in the preceding examples where it sublimes and therefore the crude material is dissolved in 960 parts of denatured alcohol at the boil, treated with 10 parts of decolorizing carbon and filtered hot. The filtrate is then cooled to 5° C. and white crystalline pyrazinamide crystallizes out. It is recovered by filtration and dried in an oven at 50 to 55° C.

*Example 6*

The procedure of Example 5 is repeated with other high boiling solvents, namely, o-, m-, and p-chlorotoluene; m-dichlorobenzene; o-bromotoluene; benzyl-methyl ether; isoamyl ether; hydrocarbon fraction boiling at 160 to 200° C., phenetole, and cresyl ethers. In each case the reaction proceeded smoothly and the results were the same as in Example 5.

We claim:

1. A process of producing pyrazinamide which comprises heating pyrazine-2-carboxamide-3-carboxylic acid until decarboxylation is substantially complete.

2. A process according to claim 1 in which the temperature is above the sublimation point of pyrazinamide, the pyrazinamide is sublimed out of the reaction mixture and recovered by condensation.

3. A process according to claim 2 in which an inert gas is passed through the reaction mixture to accelerate sublimation of pyrazinamide.

4. A process according to claim 1 in which the pyrazine-2-carboxamide-3-carboxylic acid is heated in an inert solvent.

5. A process of producing pyrazinamide which comprises heating pyrazine-2-carboxamide-3-carboxylic acid at a temperature from 160 to 250° C. until the decarboxylation is complete and recovering the pyrazinamide from the reaction mixture.

6. A process according to claim 5 in which the pyrazinamide is sublimed out of the reaction mixture and recovered by condensation.

7. A process according to claim 5 in which an inert gas is passed through the reaction mixture to accelerate sublimation.

8. A process according to claim 5 in which the pyrazine-2-carboxamide-3-carboxylic acid is heated in an inert liquid.

References Cited in the file of this patent

UNITED STATES PATENTS

| | | |
|---|---|---|
| 1,617,332 | Hartmann et al. | Feb. 15, 1927 |
| 2,479,442 | Weijlard et al. | Aug. 16, 1949 |
| 2,675,385 | Webb et al. | Apr. 13, 1954 |
| 2,705,714 | Webb et al. | Apr. 5, 1955 |

OTHER REFERENCES

Phillips: Liebigs Annalen 288, 255–65 (1895).